Nov. 23, 1943.     W. F. RIDGWAY     2,334,956
TRACER CONTROL MECHANISM FOR MACHINE TOOLS
Filed May 31, 1941     3 Sheets-Sheet 3
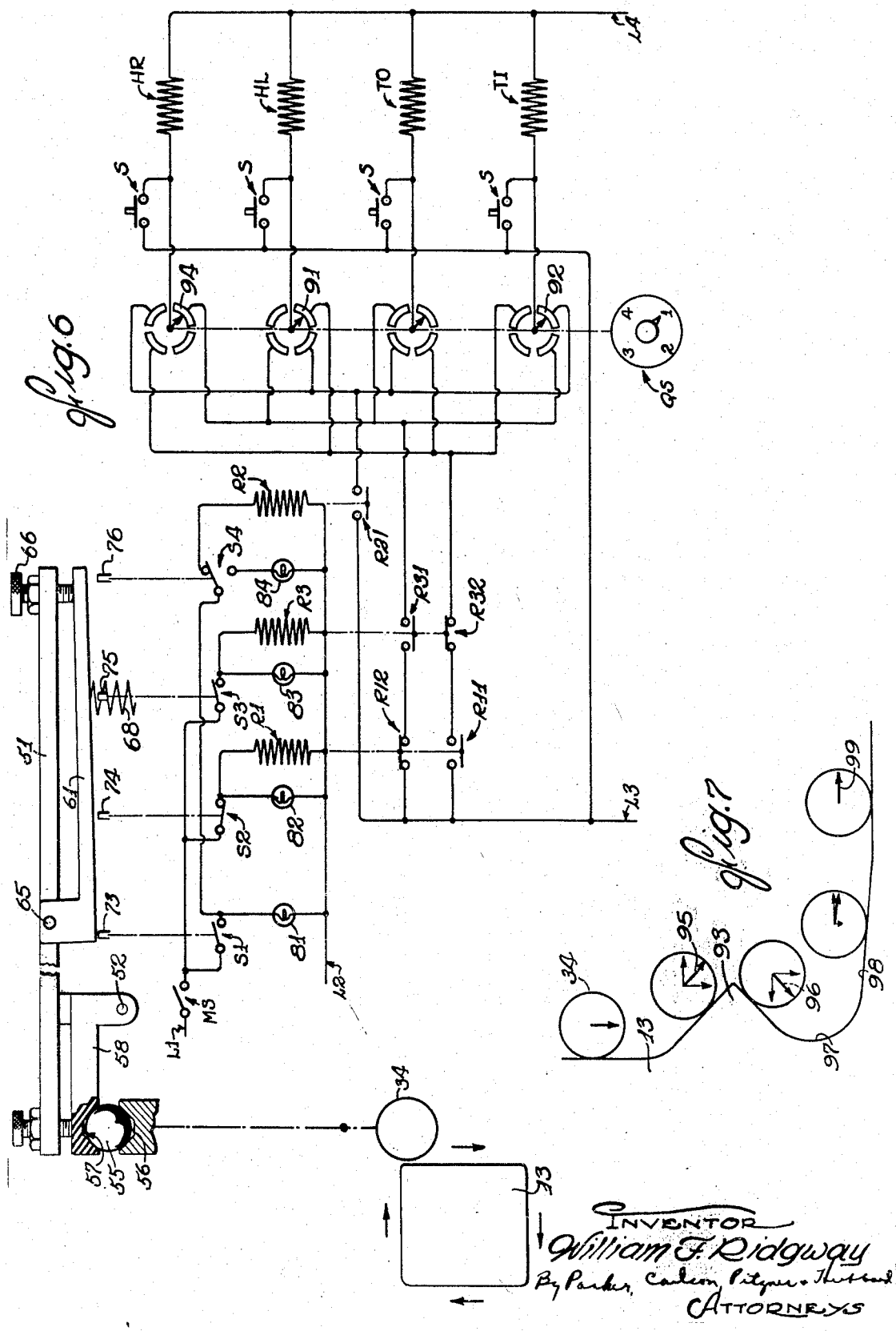

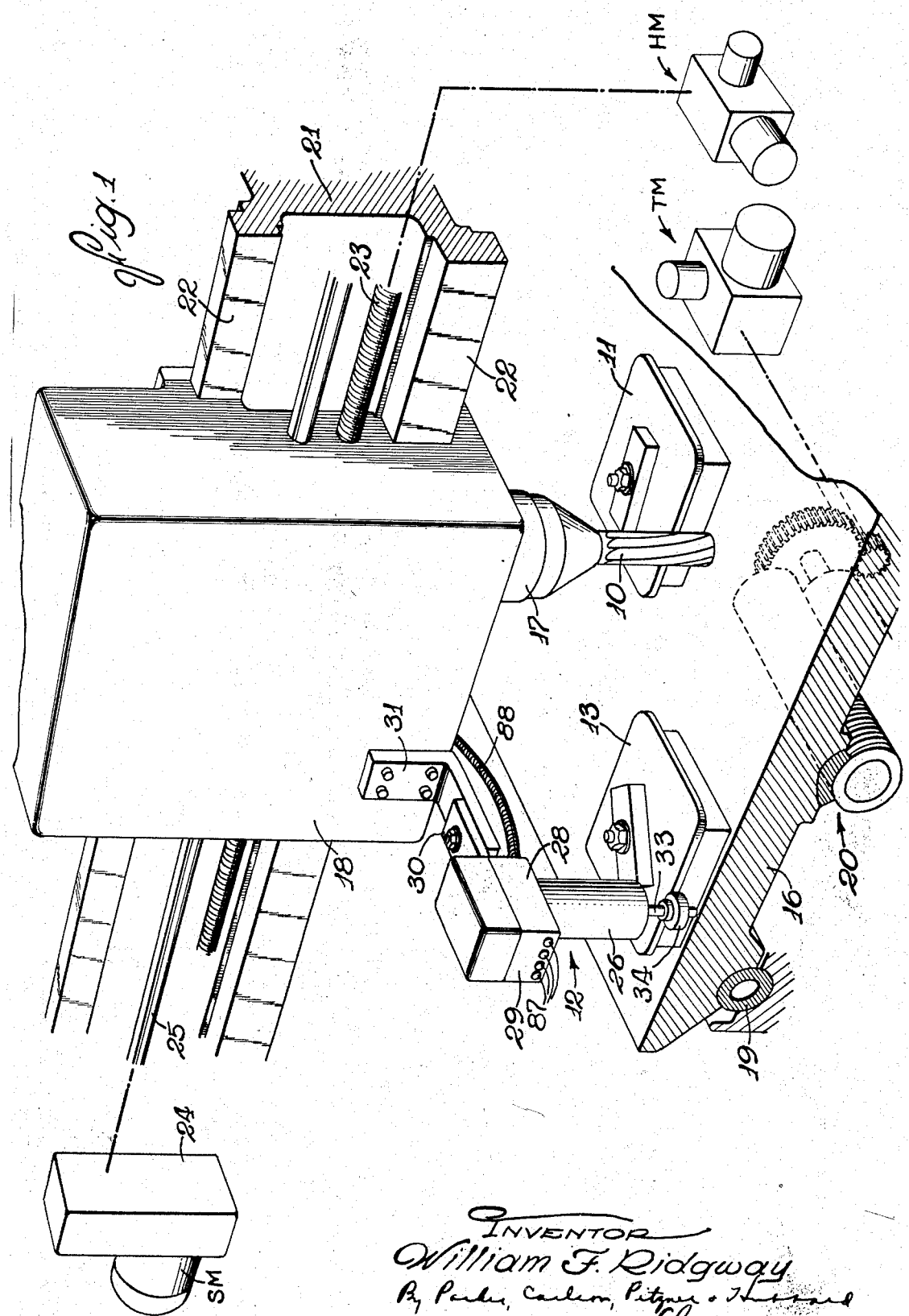

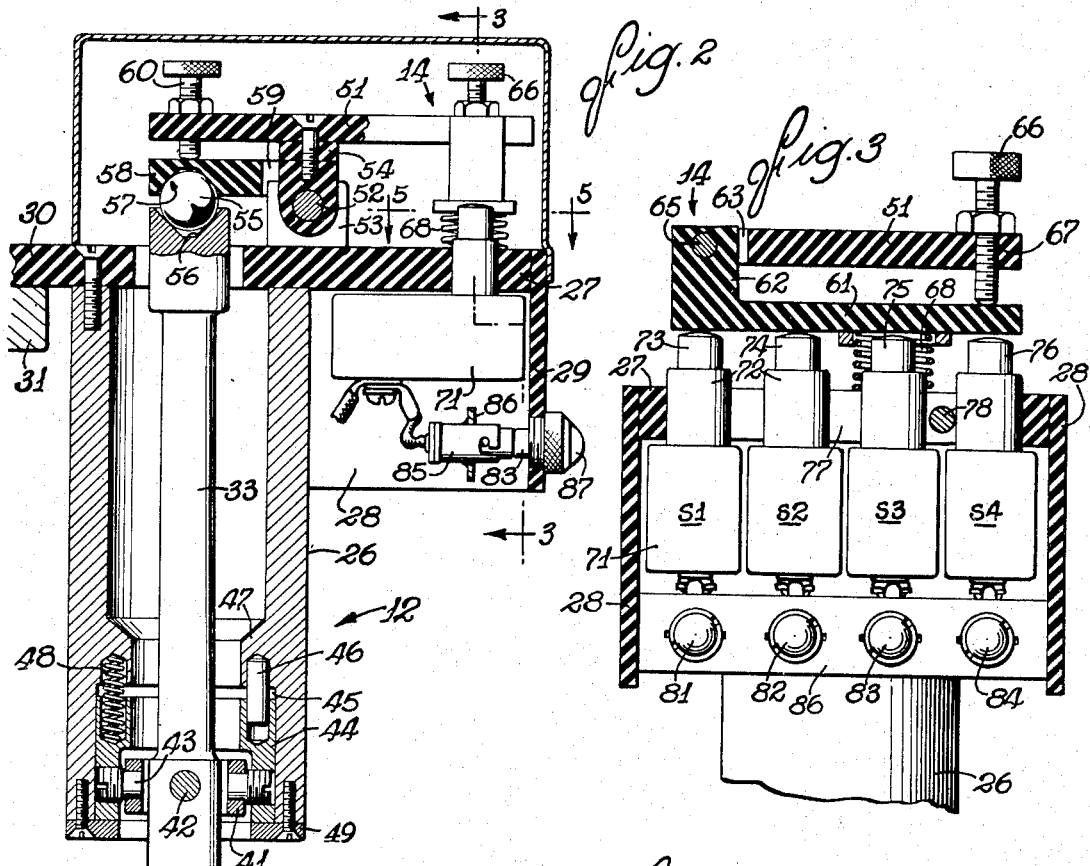
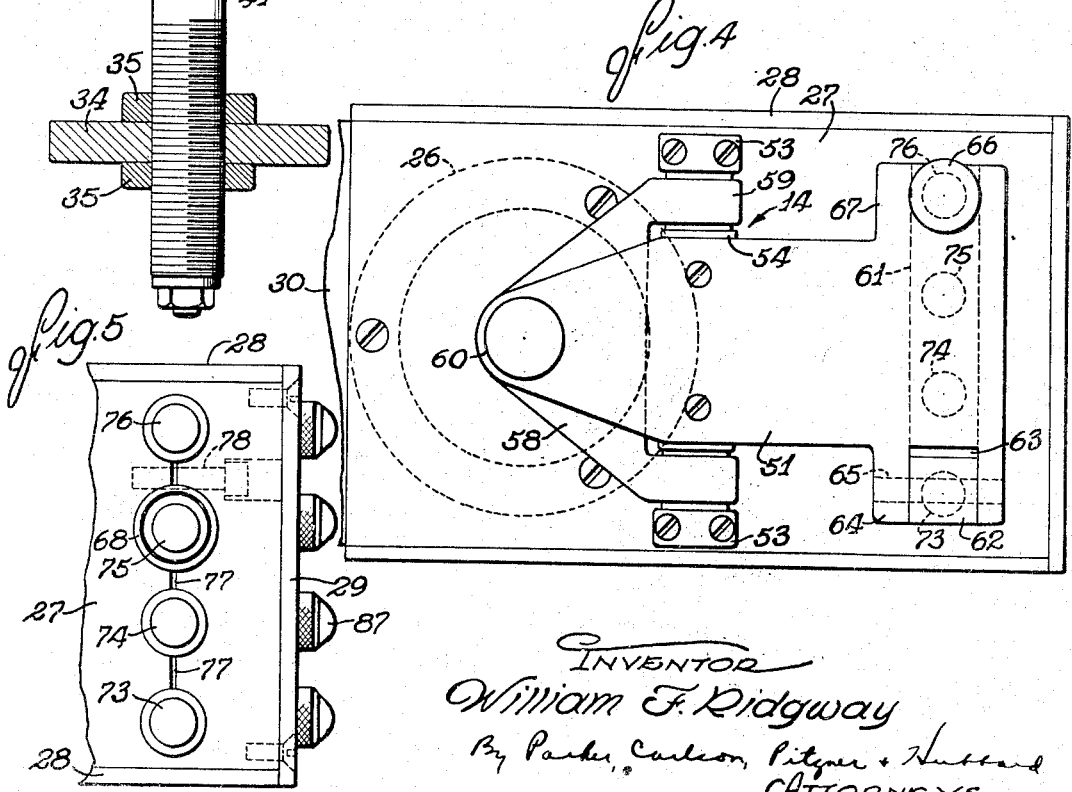

Patented Nov. 23, 1943

2,334,956

UNITED STATES PATENT OFFICE 2,334,956

TRACER CONTROL MECHANISM FOR MACHINE TOOLS

William F. Ridgway, Rockford, Ill., assignor to The Ingersoll Milling Machine Company, Rockford, Ill., a corporation of Illinois Application May 31, 1941, Serial No. 395,933

10 Claims. (Cl. 90—13.5)

The invention relates to tracer control mechanism for machine tools such as milling machines or reproducing the contour or profile of a pattern or template.

One object of the invention is to provide a tracer mechanism embodying novel means for actuating a series of electrical switches in predetermined succession for automatically controlling the relative movements of the tool and work supports to reproduce the contour or profile of a pattern on the work.

Another object is to provide a tracer mechanism embodying novel means for adjusting the sensitivity of the tracer so that the fine details of a pattern may be reproduced on the work in a finishing operation while unnecessarily accurate reproduction of such details is avoided in roughing operations with a consequent saving in time and a substantial reduction of wear on machine parts.

Another object is to provide a tracer mechanism including a pattern controlled tracer operating through a novel switch mechanism to guide a cutter around the entire periphery of a workpiece with a minimum of attention from the operator of the machine.

Still another object is to provide an improved tracer actuated electrical switch mechanism for automatically controlling the relative movements of a cutter and a workpiece, which mechanism is readily adjustable to provide any desired stock allowance on the workpiece and to compensate for differences in diameter between the pattern engaging element of the tracer and the cutter.

A further object is to provide a tracer mechanism which, by reason of its simple sturdy construction, is easily maintained in proper operating condition, which is relatively inexpensive to manufacture, and which is reliable and accurate in operation.

Another object is to provide a tracer that is readily adaptable for controlling the movements of a machine element which is translated by electric motors and controlled by starting and stopping of these motors.

Other objects and advantages of the invention will become apparent from the following detailed description of the preferred embodiment illustrated in the accompanying drawings, in which Figure 1 is a perspective view showing a tracer mechanism embodying the features of the invention as installed on a conventional milling machine.

Fig. 2 is a vertical sectional view of the tracer head.

Fig. 3 is a sectional view taken substantially along the line 3—3 of Fig. 2 showing details of the electrical control switches and the switch actuating mechanism.

Fig. 4 is a top view of the tracer head with the cover removed.

Fig. 5 is a sectional view taken along the line 5—5 of Fig. 2.

Fig. 6 is a wiring diagram showing the manner in which the electrical elements of the tracer mechanism are interconnected with the control system of the machine, the tracer and a pattern being shown diagrammatically.

Fig. 7 is a diagrammatic view showing the relative movements of a tracer and a pattern for reproducing a particular contour on a workpiece.

The invention is concerned primarily with the operation commonly known in the art as profiling, that is, the reproduction of the peripheral outline or profile of a pattern or template on a workpiece. To this end, the duplicating mechanism comprising the present invention is arranged for controlling the relative movements of a cutter 10 and a workpiece 11 in angularly related paths in a common plane under the guidance of a tracer 12 mounted in fixed relation to the cutter and positioned to cooperate with the edge portion of a pattern 13 mounted in fixed relation to the workpiece. Such control is effected through the medium of a series of electrical switches S1, S2, S3 and S4 (Figs. 3 and 6) and a switch actuating mechanism 14 (Figs. 2 to 4), the switches being arranged for operation in predetermined sequence in response to progressively increasing deflections of the tracer through engagement with the pattern.

The relative feed movements above referred to may represent movement of either the cutter or the workpiece and vary, of course, according to the specific feed required to urge the cutter toward the work and thus maintain the tracer in contact with the pattern. The particular feed instrumentalities controlled by the switches are governed in this instance by a switching device QS, hereinafter called a quadrant switch, whereby the tracer is enabled to control relative movements of the cutter and work toward and from each other as well as relative feeding movements therebetween while the tracer travels completely around the pattern.

The improved tracer mechanism may be advantageously constructed in the form of an attachment adapted for use with various types of machine tools but in certain of its aspects the invention is not limited to this particular form.

For the purpose of illustration, the tracer mechanism has been shown as a duplicating attachment adapted for installation in a conventional milling machine of the planer type. In this machine, the workpiece 11 is carried by a translatable work support or table 16 while the cutter 10 is mounted on the lower end of a vertical spindle 17 journaled on a translatable tool support or head 18. The table 16 is supported for reciprocation by horizontal ways 19 on the machine base and is arranged to be driven selectively in either direction by a reversible electric feed motor TM operating through a drive mechanism of suitable and well known character, indicated generally by the reference character 20. For convenience, forward movement of the table 16 (or generally toward the lower left hand corner of Fig. 1) will be referred to hereinafter as the "out" movement and reverse movement will be referred to as the "in" movement.

Suitably supported above the table and extending transversely thereof is a cross rail 21 having horizontal ways 22 for the head 18. A reversible electric feed motor HM is arranged to drive the head selectively in either direction on the ways through a feed screw 23. The spindle is driven by a separate motor SM through the medium of conventional gearing enclosed in a housing 24 and a splined drive shaft 25 extending along the cross rail 21.

Milling machines of the above type are ordinarily provided with electrical control systems for governing the operation thereof, such control systems including relay switches for controlling the operation of the driving and feed motors of the machine. As the present invention is concerned primarily with the relative feed movements of the head and table, only that part of the control system having to do with such movements need be considered. Accordingly, the relays for controlling the feed motors TM and HM have been shown diagrammatically in Fig. 6 with the circuit connections whereby these relays may be energized and deenergized selectively under control of the tracer 12 as well as by the push button switches S ordinarily provided. The four relays shown include relays HR and HL for controlling the head feeding motor HM, the first mentioned relay when energized causing the head to be driven to the right and the other relay causing the head to be driven to the left. When both relays are deenergized, the motor is stopped and the head remains stationary. Relays TO and TI control the table feed motor TM to effect the "out" and "in" movements of the table, respectively. Deenergization of both relays stops the motor and interrupts the movements of the table.

Having in mind the general machine organization above described, the construction and mode of operation of the tracer mechanism will now be considered. Referring particularly to Figs. 1, 2 and 4, the tracer 12 in its preferred form includes a tubular member 26 supported in a vertical position from the under side of a horizontal support herein shown as a plate 27 which, with side plates 28 and end plate 29, forms a housing for the switches S1—S4. The plate 27 is formed at its rear edge with an extension 30 adapted to be bolted or otherwise removably secured to a bracket 31 (Fig. 1) fixed to the tool head 18 whereby the tracer is held in fixed relation to the cutter 10.

Extending through the member 26 and supported thereon intermediate its ends for universal pivotal movement is a tracer arm 33 having on its projecting lower end a pattern engaging element 34 preferably in the form of a disk of approximately the same diameter as the cutter 10. The element is adjustably secured to the tracer arm as by clamping nuts 35 threaded on the arm.

To provide the universal pivotal movement, the tracer arm is pivoted directly on an annular supporting member 41 by means of a pin 42 and the member, in turn, is pivoted on studs 43 in a sleeve 44 rigidly mounted in the tubular member 26, the pivotal axes of the arm and member 41 being in the same plane but disposed at right angles to each other. As herein shown the sleeve 44 is received in a counterbore 45 in the lower end of the member 26 and is held against rotation therein by a pin 46 engaging alined apertures in the sleeve and in an annular shoulder 47 on the inner wall of the member 26. One or more coiled compression springs 48 interposed between the shoulder 47 and the end of the sleeve 44 urges the latter downwardly against a retaining plate 49 bolted or otherwise removably secured to the lower end of the tubular member.

Engagement of the element 34 with the edge of the pattern 13 incident to a relative approaching movement of the tracer and pattern will cause the tracer arm to be deflected from its normal upright or neutral position in which it is yieldably held by spring means hereinafter described. This deflection of the tracer arm is utilized to actuate the control switches S1—S4 through the medium of the switch actuating mechanism 14. The mechanism in its preferred form comprises a switch actuating lever 51 having one end projecting over the upper end of the tracer arm and the other end extending forwardly over the projecting end of the plate 27. The lever is fulcrumed intermediate its ends on a horizontally disposed shaft 52 extending through a pair of spaced upstanding lugs 53 on the plate 27 and a depending bracket 54 secured to the under side of the lever.

The switch actuating lever is operatively connected with the tracer arm so that it is rocked on its fulcrum in response to the deflection of the tracer arm in any direction from a neutral position. The operative connection is provided, in this instance, by a ball 55 seating in a generally conical recess 56 in the upper end of the tracer arm and in a similar recess 57 in the under side of an auxiliary lever 58 having a common fulcrum with the lever 51. As herein shown, the auxiliary lever is of generally triangular form and is provided at its fulcrum end with bearing lugs 59 adapted to receive the shaft 52, the lugs being spaced apart so as to straddle the bracket 54.

It will be observed that the ball 55 and the pivot pin 52 are disposed in different horizontal planes. This is for the purpose of providing maximum uniformity in the resultant movement of the switch actuator for a given deflection of the tracer arm irrespective of the direction of the deflection.

The movements imparted to the auxiliary lever by the tracer arm are transmitted to the switch actuating lever through an adjustable thumb screw 60 threaded into the lever 51 and engaging the upper surface of the auxiliary lever substantially in line with the center of the recess 57. Thus, the extent of movement of the lever 51 toward its switch actuating position by any given deflection of the tracer arm can be varied by appropriate manipulation of the screw. This provides a convenient means for compensating for small differences in diameter between the pattern engaging element 34 and the cutter 10 without disturbing the setting of the tracer. Moreover, the relationship between the tracer arm and switch actuating lever may be adjusted so that the workpiece will be cut slightly larger than the pattern if desired or, in other words, will include a stock allowance to provide for subsequent finishing operations.

Mounted on the outer or forward end of the lever 51 is an adjustable switch actuating finger 61 disposed below and extending transversely across the lever above the switches S1—S4 which, in this instance, are arranged in a straight row at the forward end of the plate 27. As herein shown, the finger 61 is provided at one end with an upstanding lug 62 adapted to be received in a transverse slot 63 in a lateral extension formed on one side edge of the lever 51 and is pivotally secured thereto as by a pin 65. A thumb screw 66 threaded into a similar extension 67 on the opposite side of the lever 51 is arranged to engage the free end of the finger to regulate its angular relation to the switch actuating lever. A coiled compression spring 68 interposed between the plate 27 and the finger 61 urges the finger upwardly against the adjusting screw and also tends to rock the levers 51 and 58 in a counterclockwise direction as viewed in Fig. 2. This serves to hold the tracer arm in its normal upright position as previously mentioned.

By reason of the adjustable mounting above described, the switch actuating finger 61 may be set in an inclined position as shown in Fig. 3 so that the switches S1—S4 will be actuated in succession as the lever 51 is rocked forwardly or in a clockwise direction as viewed in Fig. 2. The switch S1 is preferably alined with the pivotal axis of the finger so that variations in the angular position of the finger do not substantially change the amount of tracer deflection required to actuate this switch. It will be apparent, however, that such angular variations do alter the relationships between the tracer arm and the other switches. Accordingly, the degree of tracer deflection required to effect successive switch actuations, which is a measure of the sensitivity of the tracer, can be increased or decreased as desired by appropriately setting the adjusting screw.

The switches S1—S4 may be of any suitable character, those shown being of the type commonly known as "micro switches" and manufactured by the Micro Switch Company. Each includes a set of circuit controlling contacts enclosed in a housing 71 having a tubular extension 72 constituting a guide for an actuator in the form of a push button. For convenience of identification, the actuators of the four switches S1—S4 are identified by reference characters 73, 74, 75, and 76 respectively.

To facilitate installation and removal, the control switches are mounted on the plate 27 by inserting the guides 72 through suitable apertures in the plate. The sections of the plate between these apertures are slotted as at 77 and a clamping screw 78 is arranged to draw the slotted portions of the plate together to frictionally clamp the switches in place.

To provide a visual indication of the condition of the various switches during the operation of the machine, signal lamps 81, 82, 83, and 84 are arranged closely adjacent the switches and interconnected therewith as will appear presently. These lamps are received in sockets 85 soldered or otherwise rigidly secured to a cross bar 86 supported between the side plates 28 of the switch housing. A translucent cover 87 threaded into an aperture in the front plate 29 of the housing is provided for each lamp.

The manner in which the tracer switches S1—S4 control the relative movements of the cutter and tracer with respect to the work and pattern will be readily seen by reference to Figs. 6 and 7 of the drawings. To avoid overloading, the tracer switches are preferably arranged in a low voltage circuit along with suitable control relays R1, R2, and R3 for controlling the circuits for the feed relays HR, HL, TO, and TI which, in practice, are usually arranged in a higher voltage circuit. The control relays and quadrant switch may be located at any suitable place on the machine as, for example, on the control panel with the feed relays. A cable 88 (Figs. 1–3) connects them with the tracer switches. Current is supplied to the low voltage circuit by way of a line comprising conductors L1 and L2. A separate line comprising conductors L3 and L4 supplies current to the feed relays.

The functioning of the tracer switches will be best understood by considering the sequence of operations involved as the tracer follows the profile of the pattern 13. Assume, by way of illustration, that the tracer is to follow the pattern in a clockwise direction beginning at the upper right hand corner (as viewed in Fig. 6) and that the pattern engaging element 34 is positioned to the right of the pattern as shown. Since the right edge portion of the pattern is generally parallel to the reciprocatory path of the table, a relative traverse of the tracer and pattern may be obtained by an "in" movement of the table. The quadrant switch QS is accordingly set in its first position as shown. When the starting switch MS is now closed, an energizing circuit is completed for relay R1 by way of normally closed tracer switch S2. Relay R1 closes switch R11 to complete a circuit for feed relay HL by way of contact segment 91 of the quadrant switch. As explained heretofore, relay HL, when energized, causes the motor HM to feed the head 18 to the left, thus moving the element 34 toward the edge of the pattern. Relay R1 additionally opens switch R12 to prevent accidental operation of feed relay HR.

Upon engagement of the element 34 with the edge of the pattern, the tracer arm is deflected as before explained and switch S1 is closed. Closure of this switch completes an obvious circuit for relay R2 by way of normally closed contacts of switch S4. Relay R2 is energized and closes switch R21 to complete a circuit by way of quadrant switch contact segment 92 for energizing relay TI which in turn causes the feed motor TM to feed the table "in" (upwardly as viewed in Fig. 6). Thus, the tracer and pattern are relatively traversed in the direction indicated by the arrow at the right side of the pattern.

As the tool head continues its movement to the left, the tracer arm is further deflected until switch S2 is opened thereby interrupting the circuit for relay R1. This relay, in turn, opens switch R12 to deenergize feed relay HL which stops the feed motor HM and thus terminates the movement of the tracer toward the pattern. Inward feed of the table continues without further change in the circuit connections as long as the surface being traversed by the element 34 is parallel to the reciprocatory path of the table and the tracer arm is deflected to what may be called its normal operating position in which switches S1 and S2 are actuated.

If the surface of the pattern is not parallel to the path of the table or if it contains a projection such as that shown at 93 in Fig. 7 which deflects the tracer arm beyond the operating position above referred to, switches S3 will be closed to energize relay R3. The relay, when energized, closes switch R31 to complete an energizing circuit for feed relay HR by way of quadrant switch contact segment 94. The feed relay causes motor HM to feed the head to the right, thus retracting the element 34 from the pattern. Relay R3 also opens its switch R32 to prevent accidental operation of feed relay HL at this time.

The combined movements of the tool head and table will now produce a relative movement of the tracer and pattern in the direction of the arrow 95 (Fig. 7) which movement will continue as long as the tracer arm is deflected sufficiently to maintain switch S3 closed. Any further deflection of the tracer arm will result in switch S4 being opened with the result that relay R2 becomes deenergized and interrupts the "in" movement of the table. Under these conditions, the element 34 will be moved away from the pattern until the decreasing deflection of the tracer arm recloses switch S4 and restarts the table feed "in."

When the pattern engaging element passes the crest of the projection 93, the deflection of the tracer arm will further decrease until switch S3 is opened and switch S2 is closed. This initiates feed of the head to the left which, combined with the table feed, produces a relative feed of the element 34 and pattern in the direction of the arrow 96 (Fig. 7). It will be apparent, therefore, that when the quadrant switch QS is in its first position, the tracer is effective to guide the tracer and pattern along any predetermined path that can be produced by the individual or combined movements of the table "in" and of the head to the left or right. This is conveniently called the first quadrant of the tracer.

Where the pattern edge being followed requires relative movements produced by individual or combined in or out feed of the table and feed of the head to the left, as when the pattern engaging element 34 turns the lower right hand corner of the pattern 13 and follows the lower edge thereof, the switch QS is operated to its second quadrant position. In this position, relative movements of the tracer and pattern toward and from each other are effected by "out" and "in" movements of the table respectively. The starting switch MS starts the "out" movement of the table which is interrupted by opening of the tracer switch S2. Relay R3 controls the "in" movement of the table. Movement of the head to the left which produces the continuous relative feed of the tracer and pattern in the direction of the arrow below the pattern is started by switch S1 and stopped by switch S4.

In the third quadrant position of the switch QS, control of the head feed relays HR and HL is transferred back to the switches S2 and S3 but with reverse connections so that switch S2 controls movement of the head to the right while S3 controls movement of the head to the left. Relative traverse of the tracer and pattern in the direction of the arrow at the left side of the pattern shown in Fig. 6 is produced by outward movement of the table under control of tracer switches S1 and S4 in the manner before explained.

Finally, for following surfaces such as the upper edge of the pattern shown in Fig. 6, the switch QS is moved to the fourth quadrant position. This places switches S1 and S4 in control of feed relay HR which effects relative traverse of the tracer and pattern in the direction of the arrow placed above the pattern. Switches S2 and S3 control relative movement of the tracer and pattern toward and from each other through the medium of the feed relays TO and TI.

The operations involved in following an irregular pattern profile such as that shown in Fig. 7 are substantially the same as those above described except for the order in which the quadrant switch positions are selected. The pattern engaging element 34 moves around the projection 93 in the manner hereinbefore explained providing that the side edges of the projection are disposed at angles substantially parallel to the components of the simultaneous traverse movements of the head and table. For other angles, movement of either the head or table is interrupted intermittently to produce the desired component. This interruption is effected automatically, in one instance, by the tracer switch S4 when the edge is disposed at a steeper angle than that shown and by the switch S3 when the edge is disposed at a shallower angle.

When the pattern engaging element 34 reaches the reentrant section 97 of the pattern, the tracer arm is first deflected sufficiently to open switch S2 and thus interrupt the movement of the tracer to the left. As the inward movement of the table continues, further deflection of the tracer closes switch S3 and the tracer moves away from the pattern. The latter movement is interrupted, of course, before the element 34 loses contact with the pattern so that an intermittent retraction of the element takes place in timed relation to its relative traverse of the pattern, thus causing it to follow the curved path shown.

On reaching the relatively straight bottom edge 98 of the pattern, the tracer interrupts the feed of the table periodically while the head moves to the right, thus producing a component having the angular inclination of the pattern edge. At this point, the switch QS may be turned to its fourth quadrant position wherein switches S2 and S3 are placed in control of feed relays TO and TI to control relative feed of the tracer and pattern toward and from each other. Relative traverse of the tracer and pattern in the direction of the arrow 99 is now obtained by feeding the head to the right under control of tracer switches S1 and S4.

The various settings of the tracer switches are indicated visually by the lamps 81—84 to assist the attendant in regulating the machine. Thus, when the machine is initially started and the tracer is approaching the pattern, lamp 82 glows since it is connected in parallel with the relay R1. Closure of switch S1 to initiate the relative traverse feed completes the circuit for lamp 81. Lamp 82 is extinguished when the approach movement of the tracer is interrupted and lamp 83 lights when the tracer is being retracted. Finally, the circuit for lamp 84 is closed when the traverse movement is interrupted as a result of excessive deflection of the tracer. The attendant may, therefore, determine the exact condition of the tracer mechanism at any time by noting the particular lamps that are lighted.

While the operation of the tracer mechanism has been described with particular reference to the movements of the tracer and pattern, it will be understood that exactly the same relative movements take place between the cutter 10 and work 11. This is necessarily the case because the tracer is mounted in fixed relation to the cutter while the pattern is mounted in fixed relation to the work. Accordingly, as the tracer follows the profile of the pattern, the cutter describes a similar path about the workpiece and reproduces thereon the profile of the pattern.

The fidelity with which the work is shaped can be regulated by suitable adjustment of the tracer mechanism. Thus, the adjusting screw 60 may be set so that the approach movement of the cutter to the work is interrupted before the tracer arm is tilted to the angle in which it causes the cutter to cut the work to the exact dimensions of the pattern. Accordingly, an amount of stock such as required for a finishing operation will be left on the work. This adjustment may also be utilized to compensate for small differences in diameter between the pattern engaging element 34 and the cutter 10. It is therefore unnecessary to match the element exactly to the cutter or to change elements when the cutter is ground to sharpen it.

Additional adjustment is provided by the thumb screw 66 which controls the angular relation of the finger 61 to the switch actuating lever 51. When the finger is set at a relatively small angle to the horizontal, only a slight deflection of the tracer arm is required to actuate the successive control switches S1—S4. Thus, extremely fine details of the pattern detected by the tracer will be translated into appropriate movements of the cutter and work supports to reproduce the same on the work. On the other hand, by increasing the inclination of the finger 61, a much greater deflection of the tracer can take place without initiating a change in the feed movements of the cutter and work. Unnecessarily precise reproduction of fine details of the pattern is thus avoided while the general profile of the pattern is reproduced with the accuracy demanded for roughing operations. It will be appreciated that a reduction in the number of feed changes or reversals will materially reduce wear of the machine parts and will substantially reduce the time required for the operation.

It will be apparent from the foregoing that the invention provides a tracer mechanism of novel and advantageous character conveniently constructed in the form of an attachment which can be quickly and easily installed in a conventional machine tool such as a milling machine to adapt the machine for automatically shaping a workpiece in conformity to the profile of a pattern or template. The tracer mechanism is of simple, sturdy construction, yet accurate in operation. It is readily adjustable to compensate for differences in the diameter of the pattern engaging element and the cutter with which it operates and to provide a stock allowance on the work when required. Moreover, the sensitivity of the tracer may be varied as required to avoid unnecessarily accurate reproduction of fine details of the pattern on the work in roughing operations.

I claim as my invention:

1. A tracer assembly for milling machines comprising, in combination, a member adapted to be attached to the tool supporting element of a machine, a tracer arm pivoted intermediate its ends on said member and having one end positioned to engage a pattern carried by the work supporting element of the machine, a lever pivoted on said member having an operative connection with the other end of said tracer arm effective to rock the lever about its pivot when the tracer arm is deflected from a normal position by engagement with the pattern, a plurality of switches arranged in a single row substantially parallel to the pivotal axis of said lever, a member disposed transversely of said lever operative to actuate said switches in a predetermined order in response to progressively increased deflections of the tracer arm, said member being adjustable with respect to said lever to determine the degree of deflection of the tracer arm required to actuate each of said switches, and circuit connections controlled by said switches for regulating the movements of the tool and work supporting elements of the machine.

2. A tracer assembly for milling machines comprising, in combination, a member adapted to be attached to the tool supporting element of a machine, a tracer arm pivoted intermediate its ends on said member and having one end positioned to engage a pattern carried by the work supporting element of the machine, a lever pivoted on said member having an operative connection with the other end of said tracer arm effective to rock the lever about its pivot when the tracer arm is deflected from a normal position by engagement with the pattern, a plurality of switches for controlling the movements of the tool and work supporting elements of the machine, a switch actuating finger, means supporting said finger on said lever for pivotal movement about an axis substantially perpendicular to the pivotal axis of the lever, and means for adjusting the angular relation of said finger with reference to the lever to vary the timing of each switch with respect to the adjacent switch.

3. A tracer assembly for a milling machine having tool and work supports movable in right angular paths, said assembly comprising a member adapted to be mounted on the tool support of the machine, a tracer arm pivoted on said member and positioned for engagement with a pattern carried on the work support, said arm being deflected from a normal position by engagement with said pattern, a plurality of switches for controlling the movements of the machine supports, a lever adapted to be rocked in response to deflection of the tracer arm, and a finger carried by said lever for actuating said switches in a predetermined sequence effective to cause the tool to reproduce the contour of the pattern on the work, said finger being adjustable to determine the particular switches actuated by any given deflection of the tracer arm.

4. A tracer for a machine tool comprising, in combination, a member adapted to be mounted in fixed relation to the cutter of said machine tool, a tracer arm pivoted intermediate its ends on said member, a pattern engaging element carried on one end of said arm, said element being of approximately the same diameter as the cutter, a switch actuating lever fulcrumed on said member, an auxiliary lever fulcrumed on said member, means providing an operative connection between the tracer arm and said auxiliary lever effective to rock the lever on its fulcrum in response to deflection of the tracer arm, and means for transmitting the movements of said auxiliary lever to said switch actuating lever, said transmitting means being adjustable to compensate approximately for small differences in the diameter of the pattern engaging element from that of the cutter.

5. A profiling tracer having, in combination, a pivotally supported tracer arm adapted to be deflected from a normal position by engagement with a pattern, an elongated member pivoted intermediate its ends and arranged to be rocked about its pivot through an angle proportional to the deflection of the tracer arm, a group of electrical switches, a switch actuating finger disposed transversely of said member and operative when the member is rocked about its pivot to actuate the switches, and means for adjusting the angular relationship of said finger to said member to determine the amount of tracer deflection required to actuate any selected one of said switches.

6. A profiling tracer having, in combination, a pivotally supported tracer arm adapted to be deflected from a normal position by engagement with a pattern, an elongated member pivoted intermediate its ends and arranged to be rocked about its pivot through an angle proportional to the deflection of the tracer arm, a series of electrical switches arranged in a row transversely of said member, a switch actuating finger pivoted at one end on the member and extending over the row of switches in operative relation thereto, and adjustable means carried by said member and coacting with the free end of said finger for adjusting the position of the same to determine the timing of said switches.

7. A profiling tracer comprising, in combination, a tracer arm supported intermediate its ends for universal pivotal movement, a pattern contacting element mounted on one end of the tracer arm, a switch actuating lever and an auxiliary lever supported on a common fulcrum at one side of the tracer arm, said auxiliary lever being disposed below the switch actuating lever and extending over the other end of the tracer arm, means providing an operative connection between the auxiliary lever and the tracer arm effective to rock the lever on its fulcrum in response to movement of the arm on its pivot, and means for transmitting the movements of said auxiliary lever to said switch actuating lever.

8. A duplicating mechanism for a machine tool having a work support and a tool support movable in right angular paths, said mechanism comprising, in combination, a tracer adapted to be mounted on the tool support and positioned to cooperate with a pattern carried by the work support, said tracer being deflected from a normal rest position incident to its engagement with the pattern, electrical switches actuated by the deflection of said tracer, control mechanism operative to control the relative feed movements of said supports in any one of the quadrants defined by the intersection of said paths, and a circuit connecting said switches with said mechanisms including a manually operable quadrant selecting switch located remotely from said tracer and operative to selectively determine the particular quadrant in which said switches are effective to exercise control.

9. The combination with a milling machine having a work supporting table and a tool supporting head translatable in intersecting planes by individual reversible electric motors each having a pair of control relays for controlling the starting, stopping and direction of rotation thereof, of a tracer attachment including a housing adapted to be secured to the toolhead, a tracer arm pivoted intermediate its ends in said housing and having one end positioned to engage a pattern carried on the work table, a plurality of electrical switches mounted on said housing and adapted to be actuated in predetermined order responsive to the progressive deflection of the tracer arm by engagement with the pattern, and circuit connections between said switches and the motor controlling relays for enabling the tracer to control the motors and thereby effect relative movements of the table and head in a path corresponding to the contour of the pattern.

10. The combination with a milling machine having a work supporting table and a tool supporting head translatable in intersecting planes by individual reversible electric motors each having a pair of control relays for controlling the starting, stopping and direction of rotation thereof, of a tracer attachment including a housing adapted to be secured to the toolhead, a tracer arm pivoted intermediate its ends in said housing and having one end positioned to engage a pattern carried on the work table, a plurality of electrical switches mounted on said housing and adapted to be actuated in predetermined order responsive to the progressive deflection of the tracer arm by engagement with the pattern, a group of auxiliary relays, a low voltage circuit for said auxiliary relays, said switches being connected in said circuit for selectively controlling the operation of said auxiliary relays, switches actuated by said auxiliary relays, and conductors connecting said relay actuated switches with said control relays, said tracer arm acting through said control mechanism and said control relays to effect relative movements of the table and the head for reproducing the contour of the pattern on a workpiece.

WILLIAM F. RIDGWAY.